(12) United States Patent
Paul et al.

(10) Patent No.: US 12,530,794 B2
(45) Date of Patent: Jan. 20, 2026

(54) MONITORING SYSTEM AND METHOD

(71) Applicant: Transportation IP Holdings, LLC, Norwalk, CT (US)

(72) Inventors: Anthony D. Paul, Anchorage, AK (US); Ankit Mathur, Bengaluru (IN); Milan Karunaratne, Orange, CA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 113 days.

(21) Appl. No.: 17/983,516

(22) Filed: Nov. 9, 2022

(65) Prior Publication Data

US 2023/0162384 A1 May 25, 2023

(30) Foreign Application Priority Data

Nov. 24, 2021 (IN) .............................. 202111054199

(51) Int. Cl.
*G06T 7/70* (2017.01)
*G06T 7/20* (2017.01)
*G08B 13/196* (2006.01)
*H04N 7/18* (2006.01)

(52) U.S. Cl.
CPC .................. *G06T 7/70* (2017.01); *G06T 7/20* (2013.01); *G08B 13/19602* (2013.01); *H04N 7/183* (2013.01); *G06T 2207/30204* (2013.01); *G06T 2207/30236* (2013.01); *G06T 2207/30244* (2013.01)

(58) Field of Classification Search
None
See application file for complete search history.

(56) References Cited

U.S. PATENT DOCUMENTS

| 9,565,400 | B1 | 2/2017 | Curlander et al. |
| 2010/0149331 | A1* | 6/2010 | DiMare .................. G11B 27/10 348/143 |
| 2019/0311494 | A1 | 10/2019 | Ramalingam et al. |
| 2020/0143561 | A1* | 5/2020 | Hallett ....................... G06T 7/13 |
| 2020/0387177 | A1* | 12/2020 | Tankersley ............. H04N 7/185 |

(Continued)

FOREIGN PATENT DOCUMENTS

| CN | 111754581 A | 10/2020 |
| CN | 112804481 A | 5/2021 |
| IN | 202214016040 | 7/2022 |

OTHER PUBLICATIONS

First Examination Report for corresponding IN Application No. 202111054199 dated Jun. 9, 2023 (8 pages).

(Continued)

*Primary Examiner* — Samira Monshi
(74) *Attorney, Agent, or Firm* — K&L Gates LLP

(57) ABSTRACT

A method of operating a monitoring system may include receiving details of an area to be monitored, and receiving one of a) position details of an asset moving within a field of view of the area to be monitored, or b) position details of a camera configured to monitor the area. The method may include determining one of c) a position of the camera responsive to receiving the position details of the asset moving within the field of view of the area; or d) a position of the asset moving within the field of view responsive to receiving the position details of the camera.

18 Claims, 8 Drawing Sheets

(56) References Cited

U.S. PATENT DOCUMENTS

2021/0142268 A1  5/2021  Brooks et al.

OTHER PUBLICATIONS

Extended European Search Report for corresponding EP Application No. 22205740.8 dated Mar. 29, 2023 (11 pages).
Zhang et al. "Practical Camera Calibration from Moving Objects for Traffic Scene Surveillance" IEEE Transactions on Circuits and Systems for Video Technology, vol. 23, No. 36; Mar. 2013 (16 pages).
Ke et al. "Roadway Surveillance Video Camera Calibration Using Standard Shipping Container" IEEE 2017 (6 pages).
Xu et al. "Estimating 3D Camera Pose from 2D Pedestrian Trajectories" IEEE 2020 (10 pages).
Datondji et al., A Survey of Vision-Based Traffic Monitoring of Road Intersections, IEEE Transactions of Intelligent Transportations Systems (Oct. 2016), 17(10):2681-2698.
Zhang et al., Practical Camera Calibration From Moving Objects for Traffic Scene Surveillance, IEEE Transactions on Circuits and Systems for Video Technology (Mar. 2013), 23(3):518-533.
Xu et al., Estimating 3D Camera Pose from 2D Pedestrian Trajectories, 2020 IEEE Winter Conference on Applications of Computer Vision (WACV) (Mar. 1-5, 2020), pp. 2568-2577.

\* cited by examiner

MONITORING SYSTEM AND METHOD

CROSS REFERENCE TO RELATED APPLICATIONS

This application claims benefit to Indian Application No. 202111054199, filed 24 Nov. 2021, the subject matter of which is herein incorporated by reference in its entirety.

BACKGROUND

Technical Field

The subject matter described herein relates to monitoring systems and methods.

Discussion of Art

When a camera is installed within a facility, or if the camera is moved to a new position, the camera needs to be trained on what the camera is able to see, what the camera should see, and what the camera should ignore, within the field of view of the camera. As one example, the camera may be moved to an intersection of intersecting routes within a city, and a field of view of the camera may include buildings, roads, the intersecting routes, sidewalks, landscapes, vehicles, pedestrians, etc. In order for the camera to know what the camera is to monitor, the camera needs to be trained on what to monitor and/or what to ignore. For example, the camera may need to be trained to monitor only an intersection of two or more routes, and ignore pedestrian movement within the field of view, ignore movement of vehicles and/or pedestrians along other routes, ignore movement of vehicles along the routes outside of the intersection, or the like.

To train the camera on what objects the camera is to monitor during an upcoming monitoring session, an operator may receive all of the visual data from the camera, and may manually indicate which portions of the visual data is to be monitored (e.g., which routes, which types of vehicles, or the like), and which background portions of the visual data is to be ignored. This process of training the camera may take multiple days to complete. Additionally, the camera is required to be re-trained if the camera is moved to a new or different location.

Therefore, a need exists for a system and method to automatically determine a position of a camera based on known details of an area to be monitored and known position details of the asset moving or positioned within the area to be monitored.

BRIEF DESCRIPTION

In accordance with one example or aspect, a method may include receiving details of an area to be monitored, and receiving one of a) position details of an asset moving within a field of view of the area to be monitored, or b) position details of a camera configured to monitor the area. The method may include determining one of c) a position of the camera responsive to receiving the position details of the asset moving within the field of view of the area; or d) a position of the asset moving within the field of view responsive to receiving the position details of the camera.

In accordance with one example or aspect, a monitoring system may include a camera to monitor a first area, and a controller comprising one or more processors. The controller may receive sensed data from the camera. The processors may include details of the first area to be monitored. The processors may receive one of a) position details of an asset moving within a field of view of the first area to be monitored, or b) position details of a camera configured to monitor the first area. The processors may determine one of c) a position of the camera responsive to receiving the position details of the asset moving within the field of view of the first area, or d) a position of the asset moving within the field of view responsive to receiving the position details of the camera.

In accordance with one example or aspect, a method may include receiving one of a) position details of an asset moving within a field of view of an area to be monitored, or b) position details of a camera configured to monitor the area. The method may include determining one of c) a position of the camera responsive to receiving the position details of the asset moving within the field of view, or d) a position of the asset moving within the field of view responsive to receiving the position details of the camera. The method may include monitoring the area, detecting movement of one or more objects within the field of view of the area with the camera, determining that at least one of the one or more objects moving within the area one or more of along a prohibited pathway or within a prohibited region, and communicating an alert responsive to the at least one object moving one or more of along the prohibited pathway or within the prohibited region.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
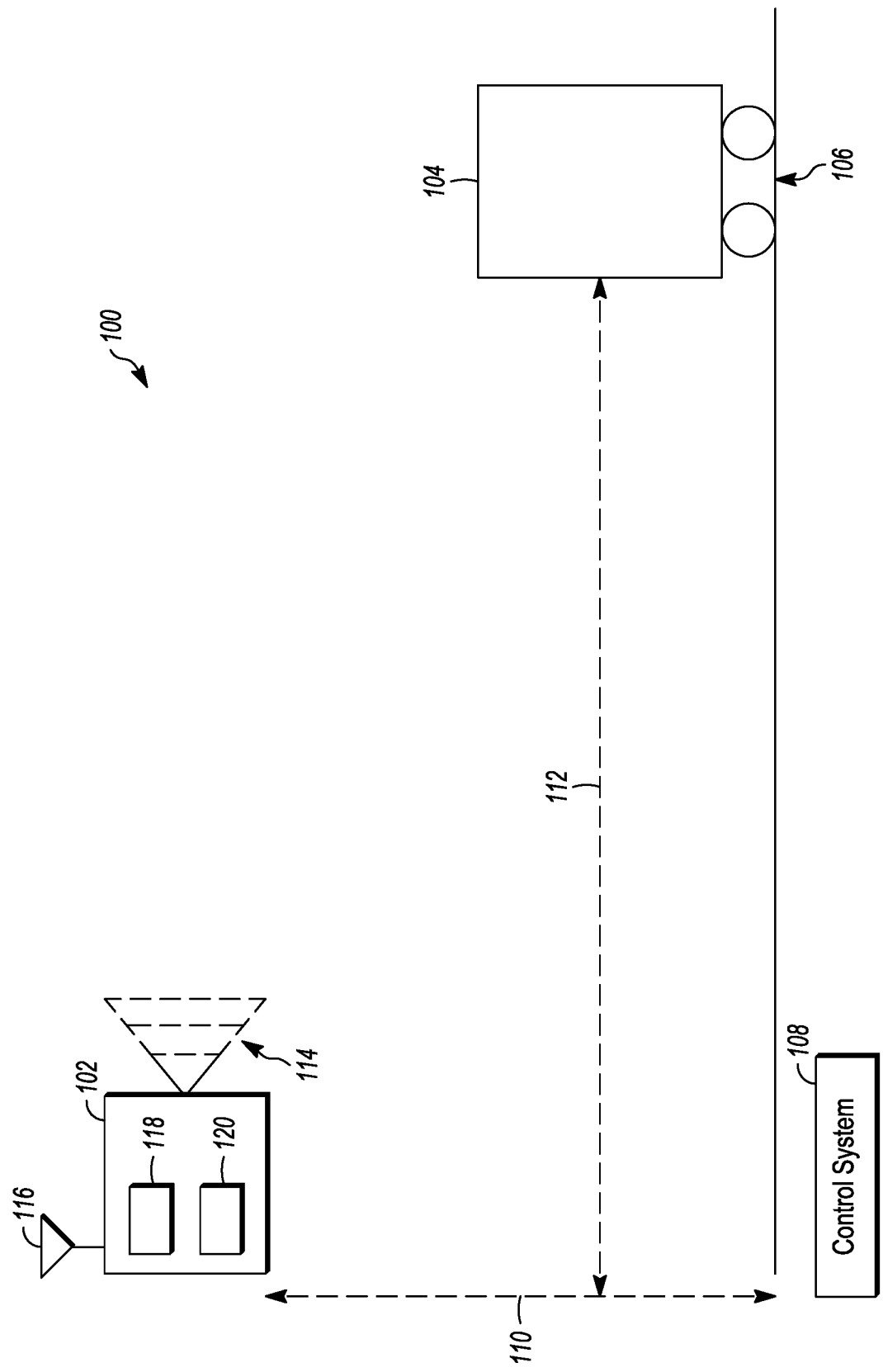
FIG. 1 illustrates a monitoring system in accordance with one embodiment.

Embodiments of the subject matter described herein relate to a monitoring system and method of operation. The monitoring system may include a camera or other visual data capturing device that may monitor an area within a field of view of the camera. The camera may be communicatively coupled with a control system that receives sensed data captured by the camera. The monitoring system may be used to monitor movement of vehicles, objects, pedestrians, or the like within the field of view of the camera. Optionally, the monitoring system may be used to monitor stationary objects within the field of view of the camera. Prior to monitoring an area with the monitoring system, the monitoring system may need to calibrate or determine one of a position of the camera, or a position of an asset that moves within the field of view of the camera.

In one embodiment, the camera may be installed at a new location. For example, the camera may be relocated to a new location for a new monitoring session, the orientation of the camera may change, or the like. The new geospatial position of the camera may be unknown and is to be determined before the camera may be used to monitor the area. If the position of the camera is unknown, the control system may receive position details of an asset moving within the field of view of the camera. As one example, the asset may be a designated asset vehicle that moves along each of the plural routes the camera is to monitor during the upcoming new monitoring session. The asset may include a marker or visual indicator that indicates to the camera to monitor movement of the asset within the field of view. For example, the marker may be a quick response (QR) code, a bar code, a color block, a shape, or the like. The asset may move along plural routes or within plural regions that the camera is to monitor, and may not move along other routes or within other regions that are not to be monitored. Optionally, the asset may move along plural routes indicating that the routes are allowable routes for movement, and the asset may move along other routes indicating that the other routes are prohibited routes for movement. The position of the camera may be determined based on the details of the area being monitored and the position of the asset moving within the field of view.

In one or more embodiments, the asset may be a vehicle system, such as a rail vehicle, an automobile, a truck, a bus, a mining vehicle, a marine vessel, an aircraft (manned or unmanned, such as a drone), an agricultural vehicle, industrial equipment, or another off-highway vehicle. Suitable rail vehicles may include a locomotive, a switcher, a shunter, or the like. Optionally, the asset and/or vehicle system may be a marine vessel, aircraft, robotic device, or the like, and may be devoid wheels. For example, the asset or vehicle system may move along a waterway, in a flight path, or the like. In one embodiment, the vehicle system is a single vehicle. In other embodiments, the first vehicle system may include two or more vehicles that may travel together. Group movement may be accomplished by vehicles being mechanically coupled together, or by being mechanically separate but logically or virtually coupled and communicating with each other to travel together, such as in a train, convoy, consist, group, swarm, platoon, fleet, or the like. At least one vehicle of the vehicle system may be a propulsion-generating vehicle, and optionally the vehicle system may include one or more non-propulsion generating vehicles.

In another embodiment, the monitoring system may be used to monitor movement of objects within the area being monitored (e.g., active use). For example, the position of the camera may remain the same or unchanged, and the camera may be used to monitor the area for a new monitoring session. If the position or location of the camera is known or understood, then the position of the camera and the details of the area may be used to determine a position of an asset moving within the field of view. For example, the position of the asset may be determined within having access to global positioning information (e.g., GPS data), and may be determined based on the position of the camera, knowledge of viewpoint edges, or other visual indicators within the field of view.

The monitoring system may be used to monitor an area within a field of view of the camera. For example, the monitoring system may monitor one or more routes, regions, pathways, areas, or the like. The monitoring system may be used to monitor stationary and/or transitory objects, vehicles, pedestrians, or the like. As one example, the camera may monitor plural routes of a rail yard within a field of view of the camera. As another example, the monitoring system may monitor an automobile parking lot that includes allowable parking regions and prohibited parking regions. As another example, the monitoring system may monitor aisles of a grocery store, movement of people within the aisles, and placement of objects within or relative to locations of the aisles. As another example, the monitoring system may monitor a marine port, and movement of marine vessels within different regions or waterways of the port. As another example, the monitoring system may monitor a portion of an airport, and monitor passengers, objects, and/or vehicles (e.g., aircraft) within the airport.

While the terms "first," "second," and so on, are used herein to indicate different vehicle systems or routes, usage of the term "first" to identify a vehicle system from among several vehicle systems does not mean that the identified vehicle system will always be the first to move (or that the "second" vehicle system will always be the second to move). Instead, unless explicitly stated otherwise, the terms "first," "second," and so on, are only used to identify the vehicle systems.

FIG. 1 illustrates one example of a monitoring system 100 in accordance with one embodiment. The monitoring system may include a monitoring device such as a camera 102 that may monitor an area within a field of view of the camera. The camera includes an optical lens 114 that is operably coupled with one or more sensors 120, such as optical sensors, audio sensors, or the like. The lens and optical sensor(s) obtain visual data of a field of view of the camera (e.g., still images, motion video, or the like). In one or more embodiments, the camera may include an audio sensor and/or audio sensing device such as a microphone or the like (not shown) that may detect or otherwise obtain audio data corresponding to an area around or proximate to the camera. For example, the camera may visually and/or audibly monitor an area within the field of view of the camera.

The camera may include a controller 118. The controller may represent a control module that can include one or more processors, microcontrollers, or other logic-based devices and/or associated software or instructions, for carrying out one or more operations described herein.

The camera includes a communication system 116 that represents transceiving circuitry, one or more antennas, modems, or the like, that may be setup for one or both of wired or wireless communication. The communication system may communication with components or systems, such as, but not limited to, a control system 108, a vehicle system 104, a wayside device (not shown) disposed along a route 106, cloud storage devices or systems, or the like. In one or more embodiments, the communication system may receive and/or provide data signals, such as sensed data signals, to the control system, to the vehicle system, or the like.

Figure 2:
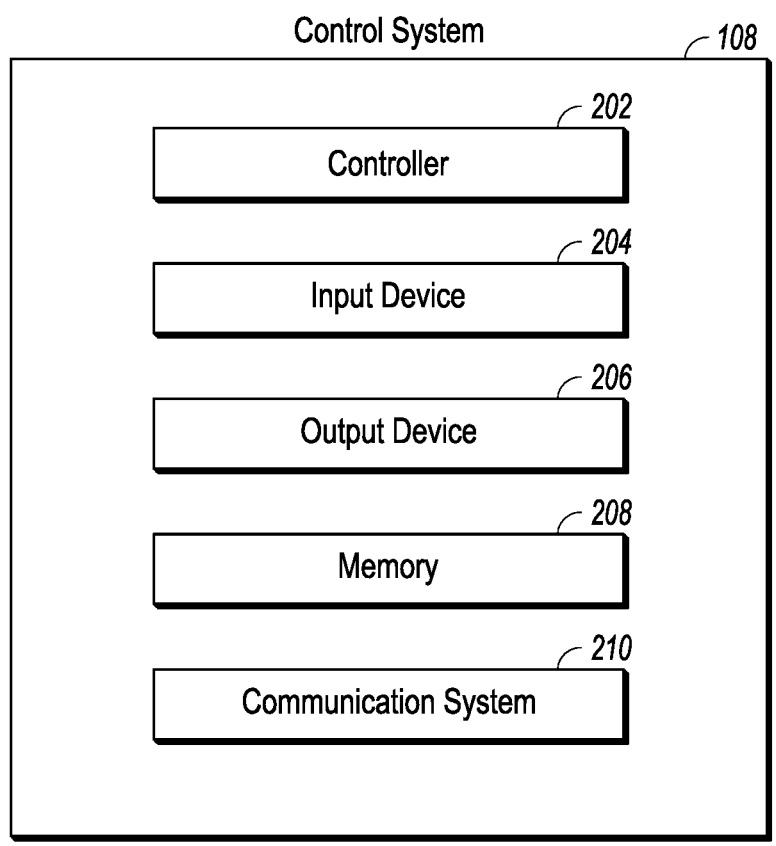
FIG. 2 illustrates a control system of the monitoring system shown in FIG. 1 in accordance with one embodiment.

The monitoring system includes a control system 108. In the illustrated embodiment, the control system is disposed off-board or separate from the camera and the vehicle system, but optionally may be disposed onboard or coupled with the camera and/or the vehicle system. FIG. 2 illustrates a schematic of the control system in accordance with one embodiment. The control system may represent a control module, and can include a controller 202 that can include one or more processors, microcontrollers, or other logic-based devices and/or associated software or instructions, for carrying out one or more operations described herein.

The control system may be manually operated by receiving instruction signals from an input device 204 e.g., a device that receives input from an operator such as, but not limited to, a touchscreen, a joystick, a keyboard, a switch, a wheel, a microphone, or the like) based on manually input from an operator at the input device. An output device 206 can provide information to the operator, such as data received from the camera (e.g. visual and/or audio sensed data), information associated with the camera (e.g., battery life remaining, camera memory storage capacity, a position of the camera, a direction the camera lens is facing, a field of view of the camera, or the like), information associated with objects, vehicles, pedestrians, or the like, being monitored by the monitoring system, or the like. The control system may include a memory 208 or other data storage device. Optionally, the control system may be communicably coupled with other storage databases (e.g., other memory devices of other systems, data storage cloud systems, or the like).

The control system includes a communication system 210 that may be setup for one or both of wired or wireless communication. For example, the communication system can represent transceiving circuitry, one or more antennas, modems, communication cables, or the like. The communication system may communication (e.g., receive and/or provide data signals) with a controller onboard one or more vehicle systems, the controller of the camera, a controller of another off-board controller, controllers of one or more wayside devices (not shown), with one or more traffic control devices (e.g., traffic lights, barriers, rail crossing gates, or the like), one or more objects within or outside of a field of view of the camera, one or more additional cameras monitoring other areas, or the like.

In one embodiment, the communication system can interact with other systems via one or more communication types. Suitable communication types can include, but are not limited to, cellular networks (e.g., the Global System for Mobile Communications (GSM)), mesh networks using Ethernet standards, wireless communication protocols (e.g., Bluetooth), radio and shortwave communication types, or the like. In one or more embodiments, where two or more communication types are present, the communication system may translate some or all of a data stream from one type to another. Similarly, different data protocols may be used. Such translation may allow the communication system to act as a transference point for data transmission. The translation may allow for different types of equipment (e.g., first and second vehicle systems may each use communication types different from each other to communicate with each other via the communication system). The communication system may switch types, protocols, and/or communication pathways in response to delegation of signal or failure of one pathway. This may provide redundancy of communication by the communication system. In one embodiment, the communication system may decrypt, decompile, or disaggregate information, parse information, and send along all or part of a message (e.g., alone or combined with new data, or with encryption, or both). The communication system may be the same as or similar to other communication devices or communication systems described herein.

In one or more embodiments, the control system may represent a back-office server or a dispatch center, such as of a positive vehicle control (PVC) system. A PVC system is a control system in which a vehicle is allowed to move, and/or is allowed to move outside a designated restricted manner (such as above a designated penalty speed limit), only responsive to receipt or continued receipt of one or more signals (e.g., received from off-board the vehicle system) that meet designated criteria, the signals have designated characteristics (e.g., a designated waveform and/or content) and/or are received at designated times (or according to other designated time criteria) and/or under designated conditions. This is opposed to 'negative' vehicle control systems where a vehicle system is allowed to move unless a signal (restricting movement) is received. The back-office server may be a vital or a non-vital system such that data stored, contained, maintained, communicated between, or the like, may be vital (e.g., protected) and/or non-vital (e.g., non-protected) data. Alternatively, the off-board control system represents another computerized system that communicates with vehicles and/or vehicle systems described herein.

Returning to FIG. 1, the camera monitors the vehicle 104 that moves along the route 106. In the illustrated embodiment, the vehicle is a propulsion-generating vehicle that includes wheels that move the vehicle along the route. The vehicle may be a rail vehicle system (e.g., locomotive, transit vehicle, rail car, etc.), an automobile, a truck, a bus, a mining vehicle, agricultural equipment, another off-highway vehicle, or the like, that includes wheels to move along the route. Optionally, the vehicle system may be devoid wheels, such as a marine vessel, an aircraft (manned or unmanned), or the like, which may move along waterways and flightpaths, respectively. In one or more embodiment, the vehicle system may include two or more vehicles that travel together along a route, such as a consist convoy, or the like. At least one of the vehicles may be a propulsion-generating vehicle, and one or more other vehicles optionally may be non-propulsion generating vehicles. As one example, the vehicle system may be a train consist that includes a propulsion-generating locomotive and plural rail cars that move together along a rail track. As another example, the convoy may include a tug or tugboat (e.g., propulsion generating marine vessel) operably coupled with a non-propulsion-generating barge that move together along a waterway.

In order for the camera to understand what routes, regions, pathways, area, or the like, that the camera is to monitor, the camera needs information associated with the area that is to be monitored, a position of the camera (e.g., a position relative to a position or location of routes, regions, pathways, areas, of the like, to be monitored), and information associated with an asset, object, person, or the like, that is to be monitored.

Figure 3:
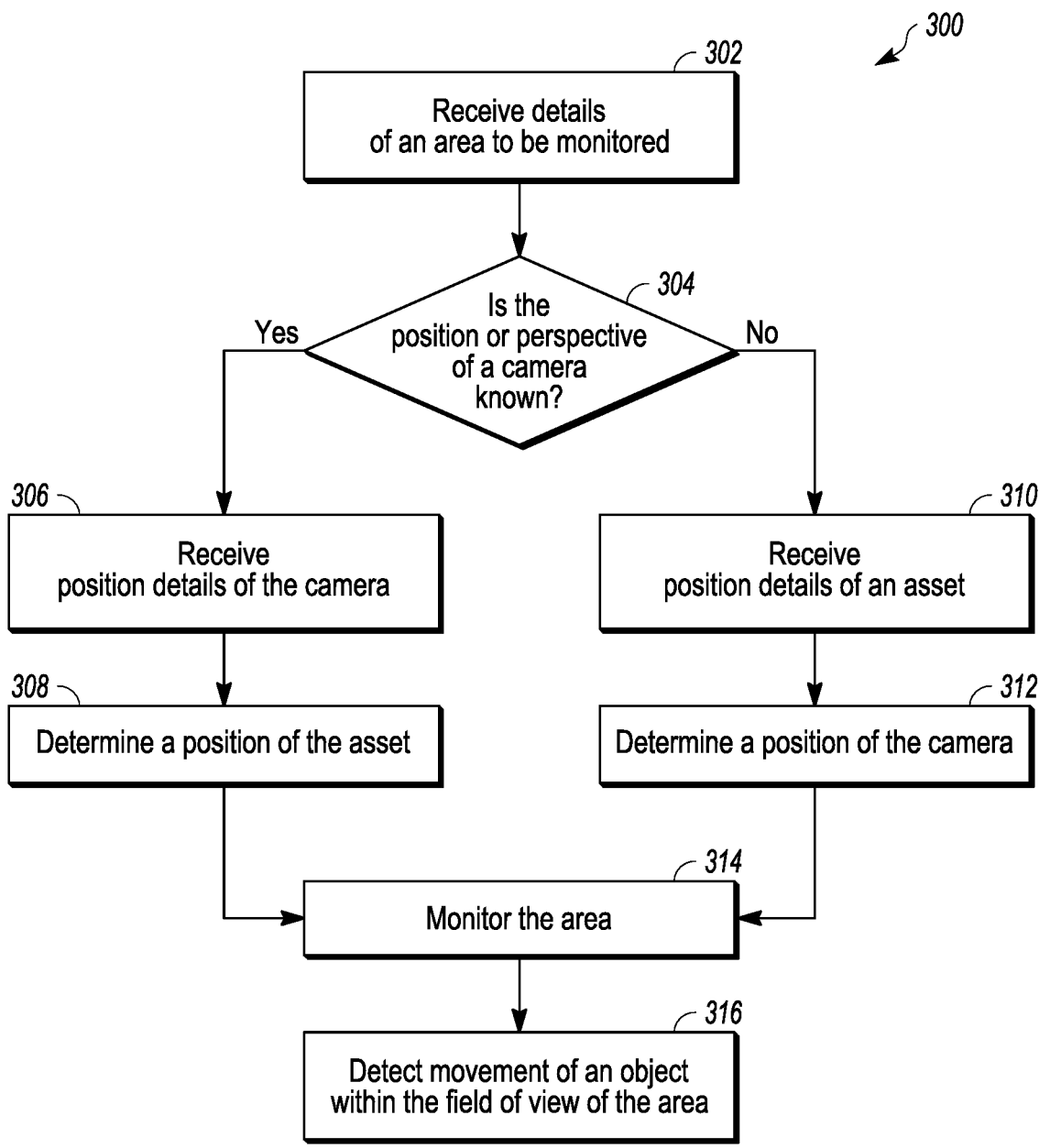
FIG. 3 illustrates a flowchart of a method of monitoring an area in accordance with one embodiment.

FIG. 3 illustrates a flowchart 300 of one example of a method of monitoring an area in accordance with one embodiment. The steps of the method may be completed by the monitoring system shown in FIG. 1. The area that is to be monitored may be a new area to be monitored. For example, the camera may have previously been monitoring one area, and may be moved (e.g., rotated, displaced, repositioned, or the like) by an operator of the monitoring system to monitor a different area. Optionally, the area to be monitored may be the same, but the objects, assets, routes, regions, pathways, or the like, may be different. For example, the camera may be obtaining visual sensor data associated with vehicles that move along a first route during a first monitoring session, and may obtain visual and audio sensor data associated with vehicles that move along a different, second route during a second, new monitoring session.

At step 302, one or both of the controller of the off-board control system or the controller of the camera, may receive details of an area that is to be monitored. The position details of the area that is to be monitored may include topographical details, route zone details, an indication of regions where positioning, movement, or the like, of objects and/or vehicles is allowed, an indication of regions where positioning, movement, or the like, of objects and/or vehicles is prohibited, or the like. In one or more embodiments, the position details of the area may include speed limits, vehicle restrictions, vehicle allowance, or the like, associated with one or more pathways, routes, regions, or the like, disposed within the area to be monitored. In one or more embodiments, the details of the area may include historical details associated with the area, such as historical data associated with a number and/or type of different vehicles that moved along one or more routes within the area, historical data associated with routes, pathways, and/or regions receiving maintenance and/or repairs (e.g., repaving of paved routes, repainting of vehicle and/or pedestrian pathway lines and/or lanes, or the like). Optionally, the details of the area may include environmental information (e.g., ambient temperature, humidity, or the like), geographical information (e.g., geographic latitude and longitudinal coordinates), or the like.

At step 304, a determination is made whether the position and/or perspective of the camera is known. For example, if the camera has been moved (e.g., pivoted, relocated, installed, changed from a first position to a second position, or the like) from a first location to a second location, the position and/or perspective of the camera may be unknown, and the camera may need to be calibrated to understand the location of the camera relative to the area to be monitored. Alternatively, if the camera has not been moved, but is being used to monitor a new monitoring area within the field of view of the camera, if the camera is to focus on new details (e.g., objects, vehicles, pedestrians, or the like) within the same field of view of the camera, the camera does not need to be calibrated or recalibrated, or the like, the position and perspective of the camera may be known. For example, the position, orientation, perspective, location, or the like, of the camera may be known from a prior monitoring session, and may not be needed for a new monitoring session where the position and/location of the camera is not moved between the prior and new monitoring sessions.

The position, location, and/or the perspective of the camera may be known if the off-board control system and/or the controller of the camera know or have information associated with a geospatial location of the camera. For example, returning to FIG. 1, the position and/or location of the camera may be known if the control system and/or the controller of the camera know or are able to access details associated with an elevation distance 110 the camera is positioned, such as above the route, a horizontal or longitudinal distance 112 between a portion of the camera and the vehicle, or the like. Optionally, the location and/or position may be known if the control system and/or the controller of the camera have details associated with the geographic coordinates.

If the camera is calibrated such that one of the position, location, and/or perspective of the camera is known, flow of the method proceeds toward step 306. At step 306, responsive to determining that the position, perspective, and/or location of the camera is known, the off-board control system and/or the controller of the camera may receive the position details of the camera (e.g., elevation distance above sea level, above the route, above the area to be monitored, longitudinal distance away from a route, region, pathway, or the like, to be monitored, or the like). In one embodiment, the controlled of the camera may receive the position details of the camera from the off-board control system. In another embodiment, the control system and/or the controller of the camera may receive the position details of the camera from another database accessible by the control system and/or controller, respectively.

At step 308, a position of an asset moving within a field of view of the camera may be determined responsive to receiving the position details of the camera. In one or more embodiments, the asset may be a vehicle, object, pedestrian, or the like. The position of the asset may be determined based on the position details of the camera, the details of the area that is being monitored, or the like. For example, the position of the asset may be determined without having geospatial or other positioning information of the asset. The real position of the asset may be determined from knowing viewpoint edges of the field of view of the camera, knowing locations of other visual indicators within the field of view, or the like. In one or more embodiments, the visual indicators may be a pole, a building, another object that has remained stationary between the prior and new monitoring sessions, or the like.

Alternatively, if the camera is not calibrated and the position or perspective of the camera is unknown, flow of the method proceeds from step 304 toward step 310. For example, the camera may need to be calibrated to understand the location, position, and perspective of the camera relative to the area to be monitored before the camera may be used to monitor an area. In one or more embodiments, the camera may be calibrated to be used to monitor an area based on details of the area and details of a position of an asset that moves within the field of view of the camera.

At step 310, the control system and/or the controller of the camera may receive position details of the asset. The position details may include a geospatial location, topographical information of routes, pathways, or regions along which mobile assets are moving, or the like. In one or more embodiment, the position details may be received from a global positioning system (GPS) onboard and/or coupled with the asset. Optionally, the position details may be received from a wayside device that detects movement of the asset.

Figure 4:
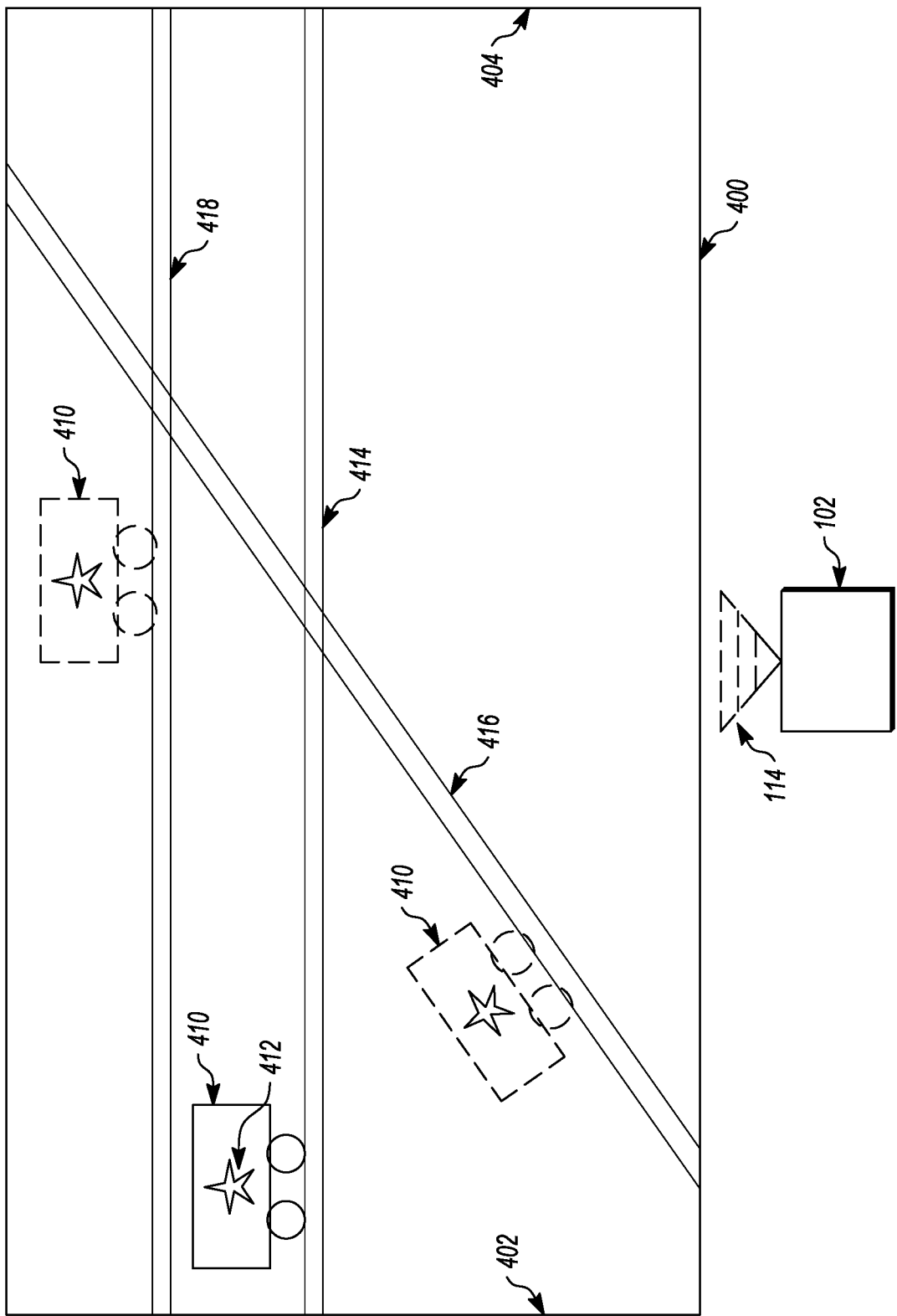
FIG. 4 illustrates a schematic of one example for receiving position details of an asset in accordance with one embodiment.

In one or more embodiments, an asset may move within the field of view of the camera along a route that the camera is to monitor during a monitoring session. For example, FIG. 4 illustrates a schematic of one example for receiving position details of an asset 410 in accordance with one embodiment. In the illustrated embodiment, the asset is a vehicle that moves within a field of view 400 of the camera. The field of view is defined by a first defining mark 402 and a second defining mark 404. In the illustrated embodiment, the first and second defining marks are first and second edges, respectively, of the field of view of the camera. Optionally, the first and second defining marks may be objects and/or predefined locations within the field of view. The camera may detect or capture image data of the asset by monitoring movement of the asset within the field of view relative to the first and second defining marks.

The asset may include a marker 412, visual indicator, or the like, that the visual sensor of the camera may detect. For example, the marker may be a quick response (QR) code displayed on an exterior surface of the asset that the camera may detect. As another example, the marker may be another bar code, a color block, or the like, displayed on a side of the asset as the asset moves within the field of view. In the illustrated embodiment, the marker is a star shape that is displayed on an exterior surface of the asset.

The camera may identify the asset as an asset to monitor (e.g., based on the marker or visual indicator), and may monitor the asset as the asset moves in one or more directions in the field of view of the camera. In one or more embodiments, the asset may move along a pathway, a route, or the like, that indicate to the controller of the camera which pathways, routes, or the like, the camera is to monitor during an upcoming monitoring session. For example, the asset may move along a first route 414 within the field of view of the camera, may subsequently move along a second route 416 within the field of view, and may subsequently move along a third route 418. The first, second, and third routes may be routes or pathways that the camera is to monitor during an upcoming monitoring session.

In one or more embodiments, one or more of the first, second, and third routes may be identified as routes that objects or vehicles may be allowed or permitted to move along during the upcoming monitoring session. Optionally, the asset may move along a prohibited pathway, prohibited route, or the like, to inform the controller of the camera which pathways and routes vehicles, objects, and pedestrians are not allowed to move during the upcoming monitoring session. For example, one of the first, second, or third routes may be identified as routes that vehicles and objects may be prohibited from moving along during the upcoming monitoring session.

Returning to FIG. 3, at step 312, the control system and/or the controller of the camera may determine a position of the camera based on the position details of the asset and the details of the area to be monitored. In one or more embodiments, the position of the camera may be determined (e.g., the camera may be calibrated) based on a combination of two or more of the details of the area to be monitored, the visual sensor data indicative of movement of the asset within the field of view (e.g., movement of the asset within the field of view along at least one of plural paths), and the known position details (e.g., GPS position details) of the asset as the asset moved within the field of view.

At step 314, the area is monitored during a monitoring session. The camera may understand which routes, pathways, regions, or the like, the camera is to monitor during the monitoring session, and may monitor movement or positioning of vehicles, objects, pedestrians, or the like, within or along the routes, pathways, regions being monitored. For example, the camera may ignore vehicles or objects moving along routes or pathways that are not being monitored. Optionally, the camera may understand which types of vehicles, types of objects, or the like, the camera is to monitor during the monitoring session, and may monitor the specified types of vehicles and objects during the monitoring session and may ignore other types of vehicles and objects.

At step 316, the camera may detect movement, placement, or positioning, of vehicles, objects, or the like, within the field of view of the camera in the area being monitored. For example, the camera may monitor vehicles that move along one route, and may wirelessly communicate the sensed visual data to the control system. In one embodiment, the communication system of the camera may communicate the sensed data at a predefined increment of time (e.g., once every hour, once every 24 hours, once every week) or responsive to predefined events occurring (e.g., a predefined number of vehicles have moved along the route, a prohibited vehicle has moved along the route being monitored, a vehicle has moved along a prohibited route, or the like).

In one or more embodiments, the control system may receive the sensed data from the camera and may analyze the data to determine one or more characteristics of the area being monitored. For example, the control system may determine that an amount of level of congestion of vehicle traffic has increased over a predetermined amount of time. As another example, the control system may determine a length of time that an object has remained positioned at a location within the field of view. As another example, the control system may determine a number of times that a vehicle system has moved into and/or out of the field of view, and/or a speed at which the vehicle system moves each time the vehicle system moves into and/or out of the field of view. As another example, the control system may determine a speed at which vehicles, objects, or pedestrians move along one route, and a speed at which other vehicles, objects, or pedestrians move along another route or pathway. As another example, the control system may determine a frequency at which vehicles or objects move along a first route, and a frequency at which vehicles or objects move along a second route. Optionally, the sensed data may be used in any alternative manner by the control system to understand the field of view of the area being monitored. In one or more embodiments, the sensed data of a first monitoring session may be compared with sensed data of a second monitoring session.

Figure 5:
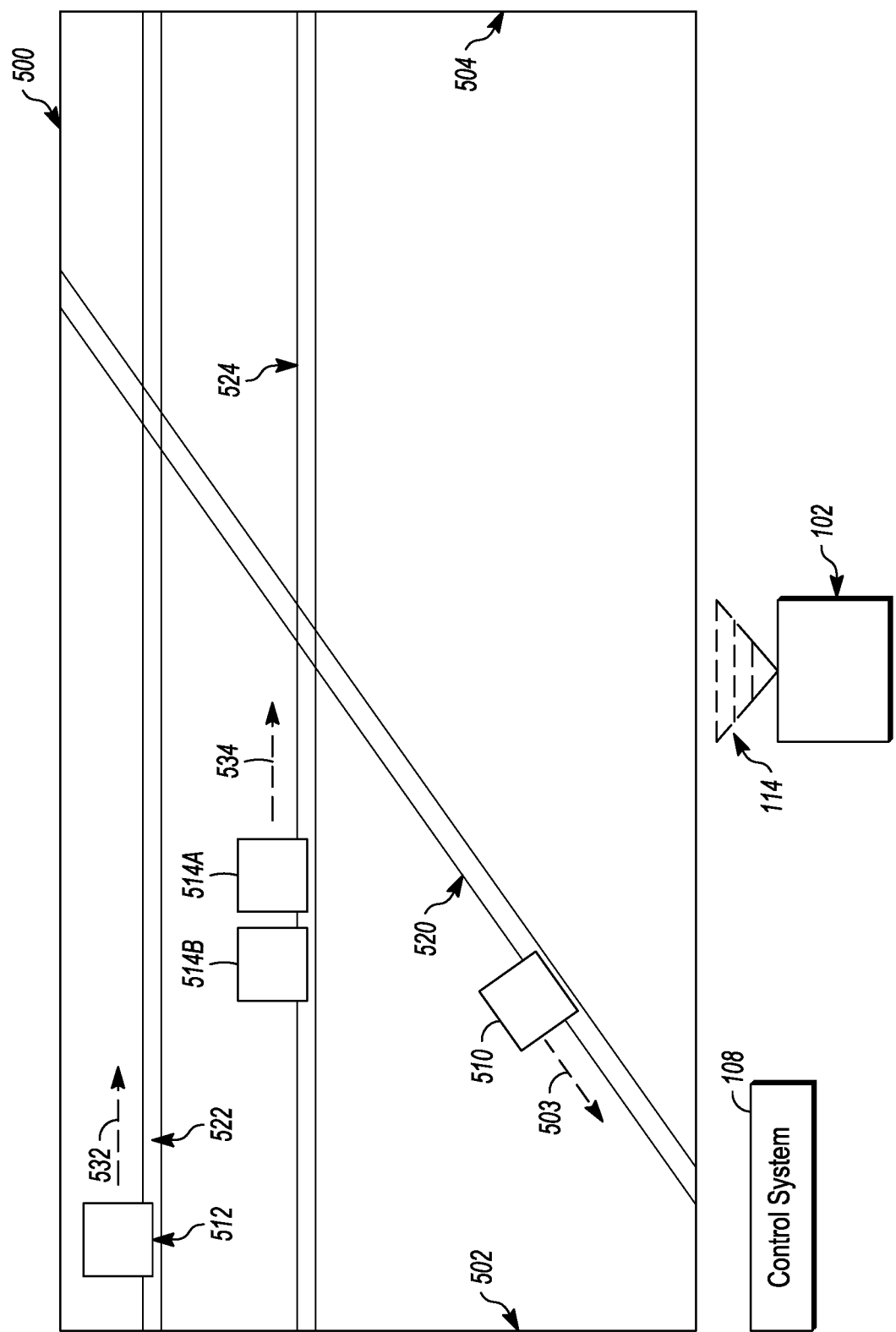
FIG. 5 illustrates one example of monitoring an area with a monitoring system in accordance with one embodiment.

An area may be monitored responsive to determining one of the position of the camera or the position of the asset. FIG. 5 illustrates one example of monitoring an area with a monitoring system in accordance with one embodiment. The lens of the camera may be positioned, oriented, and sized to capture a field of view 500 of the area to be monitored. The area to be monitored within the field of view may be defined by a first defining mark 502 (e.g., a first edge of the field of view) and a second defining mark 504 (e.g., a second edge of the field of view).

In the illustrated embodiment, plural different vehicles move along plural routes, and the camera may monitor movement of vehicles and/or objects along each of the plural routes. For example, a first vehicle system 510 moves in a first direction 530 along a first route 520, a second vehicle system 512 moves in a second direction 532 along a second route 522, and a third vehicle system 514 moves in a third direction 534 along a third route 524. The third vehicle system includes first and second vehicles 514A, 514B that move together (e.g., mechanically and/or logically) along the third route.

The control system may receive sensed data (e.g., visual data, audio data, or the like) from the camera. In one embodiment, the control system may receive details of the first vehicle system moving along the first route, and may determine that the first vehicle system is prohibited from moving along the first route. Optionally, the control system may determine that the first vehicle system is allowed to move along the first route, but is prohibited from moving in the first direction along the first route. The control system may automatically wirelessly communicate an alert to the first vehicle system directing the first vehicle system to move to a different route, to change a direction of movement, or the like. In one or more embodiments, a controller of the first vehicle system (not shown) may automatically change operating settings based on the alert communicated by the control system. Optionally, the control system may remotely control operation of the first vehicle system to remotely change an operating setting of the first vehicle system (e.g., to change a direction of movement of the first vehicle system, to slow or stop movement of the first vehicle system, or the like).

Figure 6:
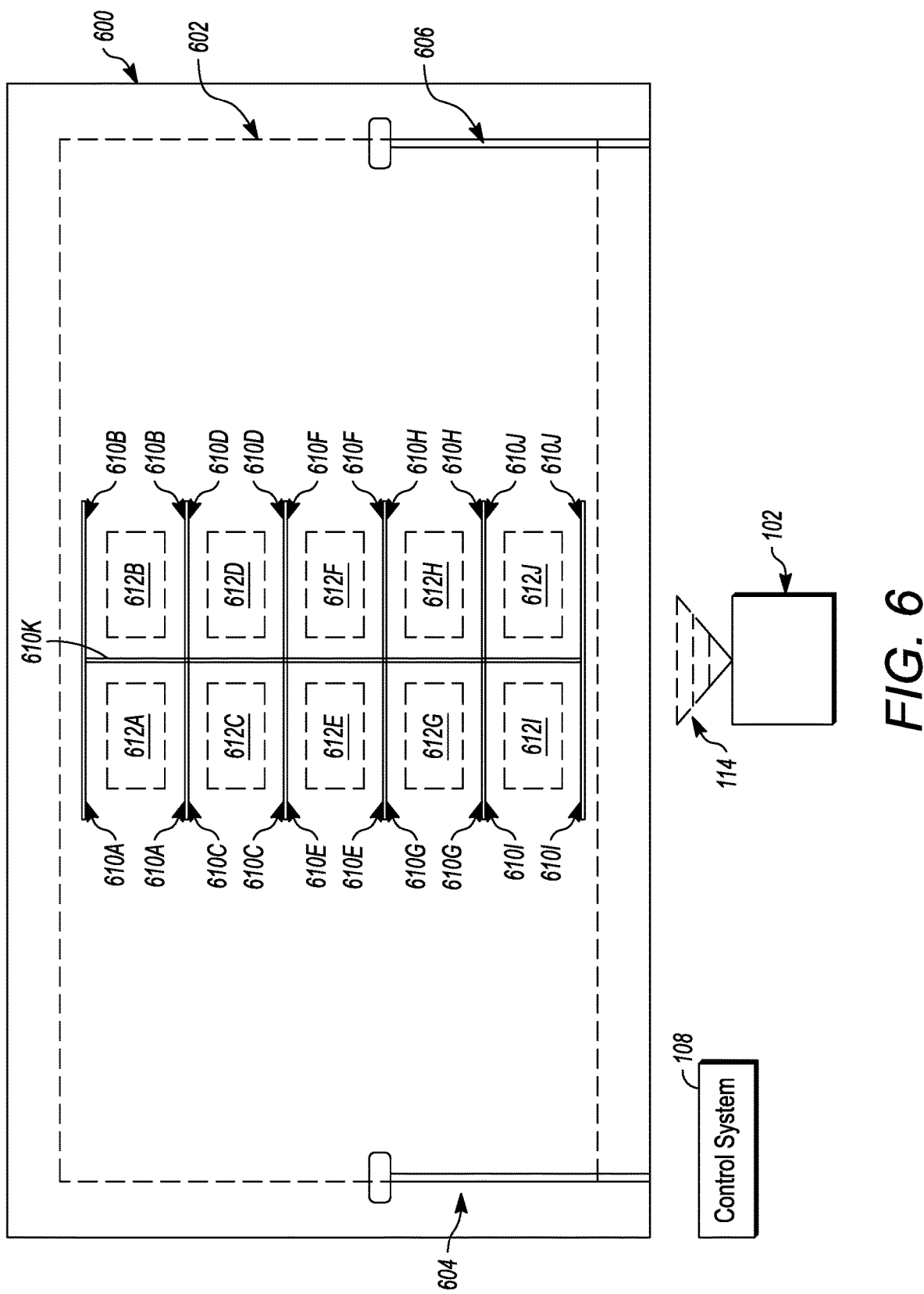
FIG. 6 illustrates one example of monitoring an area with a monitoring system in accordance with one embodiment.

FIG. 6 illustrates another example of monitoring an area with a monitoring system in accordance with one embodiment. The control system may have received the details of an area 602 within a field of view 600 to be monitored, and may have determined one of a position of the camera or a position of an asset moving within the field of view. In the illustrated embodiment, the area to be monitored is smaller than the field of view of the camera lens. The area to be monitored is defined by a first defining marker 604 and a second defining marker 606. In the illustrated embodiment, the first and second defining markers are objects within the field of view of the camera. The field of view may include a parking lot or parking area where vehicles may pull into and out of to park, and the defining markers may be light poles within the parking lot.

The area to be monitored includes plural prohibited pathways 610A-K that may represent the parking lanes defining parking spaces. The area includes plural parking regions 612A-J that are defined by the prohibited pathways, and may indicate allowable regions or areas where vehicles or objects may move into or out of, or may be positioned (e.g., parked). The camera may monitor the area and communicate the sensed data to the control system. The control system may determine that a vehicle is parked or positioned along or across one of the prohibited pathways, and may communicate an alert to an owner of the parking lot. Optionally, the control system may communicate an alert to a towing company indicating that the vehicle parked or positioned across one of the prohibited pathways needs to be removed.

Figure 7:
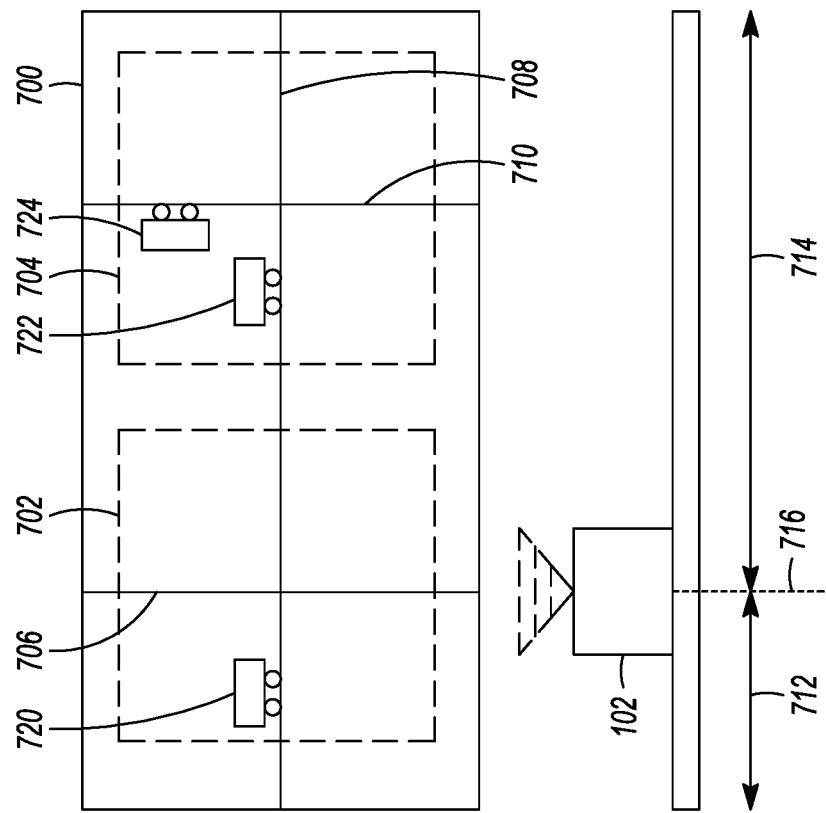
FIG. 7 illustrates one example of monitoring a first area with a camera of a monitoring system in a first position in accordance with one embodiment.

FIG. 7 illustrates one example of monitoring a first area 702 with the camera of the monitoring system in a first position 716 in accordance with one embodiment. A field of view 700 of the camera may include the first area to be monitored and a second area 704. The camera may monitor plural routes and movement of objects or vehicles within the first area along the plural routes, and may ignore movement of objects or vehicles within the second area during a monitoring session. For example, the camera may monitor a first route 706 and a portion of a second route 708 that extends within the first area, and may ignore another portion of the second route that extends within the second area and a third route 710. The camera may monitor movement of a first vehicle system 720, but may ignore movement of second and third vehicle systems 722, 724, respectively, that move in the second area. Optionally, the camera may begin to monitor movement of the second vehicle system responsive to the second vehicle system moving along the second route and into the first area being monitored.

Figure 8:
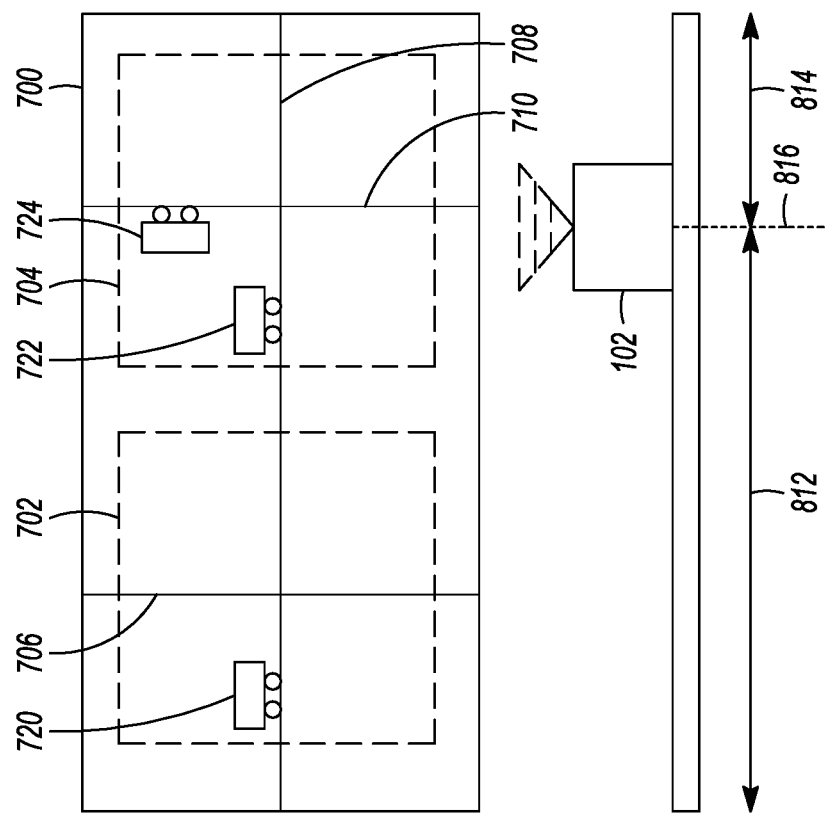
FIG. 8 illustrates one example of monitoring a second area with a camera of a monitoring system in a second position in accordance with one embodiment.

The first position of the camera is defined by a first distance 712 away from a first edge of the field of view of the camera, and a second distance 714 away from a second edge of the field of view of the camera. Optionally, the position of the camera may move from the first position 716 to a second position. For example, FIG. 8 illustrates one example of monitoring the second area with the camera in a second position 816. The position of the camera may need to be calibrated responsive to moving the camera from the first position to the second position. For example, the steps 310 and 312 shown in the flowchart illustrated in FIG. 3 may be repeated based on the camera moving from the first position to the second position. For example, the controller of the camera and/or the control system may receive position details of an asset moving within the field of view responsive to changing the position of the camera from the first position to the second position.

The camera positioned in the second position may monitor the second area of the field of view and may ignore the first area. For example, the camera may monitor a portion of the second route 708 and the third route 710, and may ignore the first route 706 while the camera monitors movement within the second area. The camera may monitor movement of the second vehicle system 722 and movement of the third vehicle system 724 as the second and third vehicle systems move within the second area, and may ignore movement of the first vehicle system 720 that moves within the first area. Optionally, the camera may begin to ignore movement of the second vehicle system responsive to the second vehicle system moving along the second route out of the second area and toward the first area.

The second position of the camera is defined by a first distance 812 away from a first edge of the field of view of the camera, and a second distance 814 away from a second edge of the field of view of the camera. For example, the camera in the first position shown in FIG. 7 is closer to the first edge of the field of view relative to the camera in the second position shown in FIG. 8. Additionally, the camera in the first position shown in FIG. 7 is further from the second edge of the field of view relative to the camera in the second position shown in FIG. 8.

Figure 9:
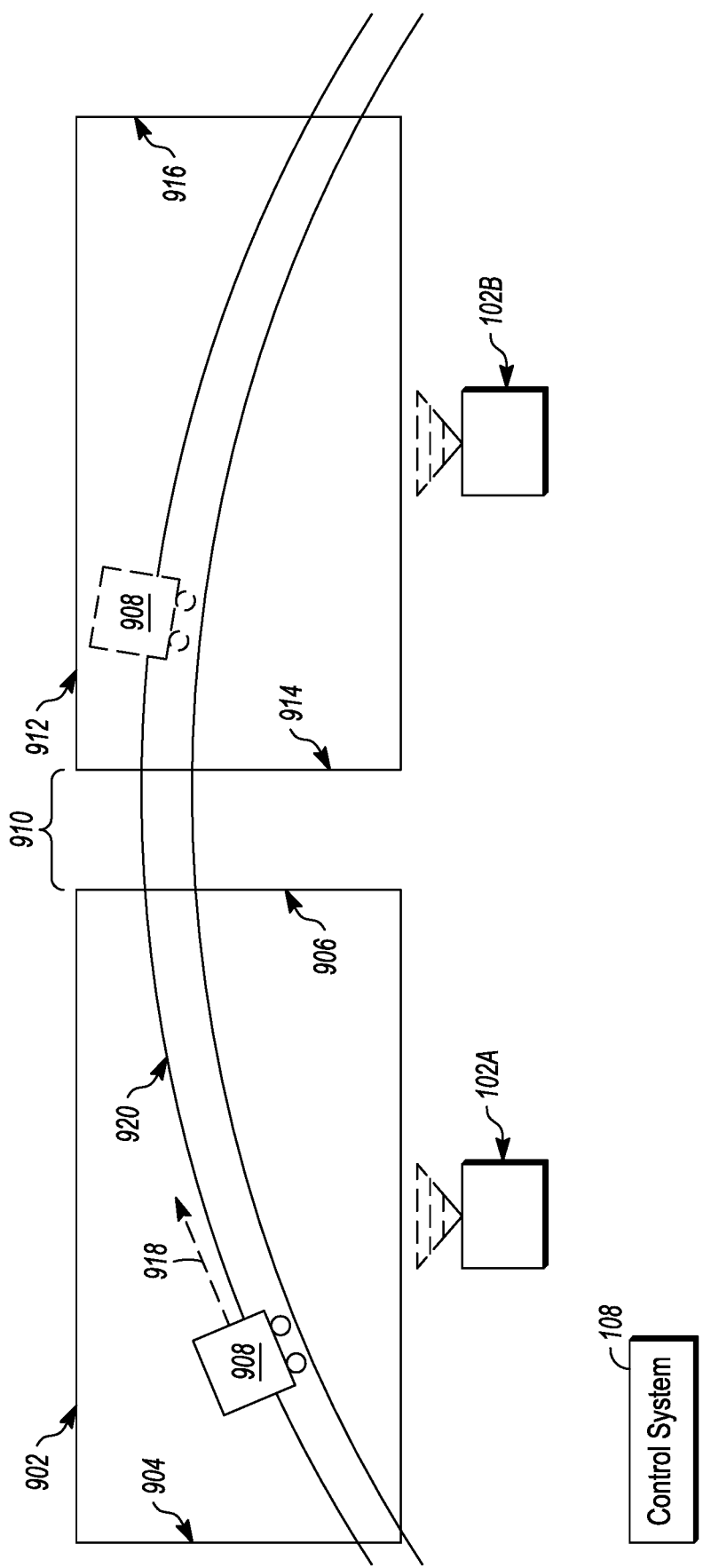
FIG. 9 illustrates a monitoring system that monitors plural different areas in accordance with one or more embodiments.

FIG. 9 illustrates a monitoring system that monitors plural different areas in accordance with one or more embodiments. The monitoring system includes the control system that is communicatively coupled with a first camera 102A and a second camera 102B. The first camera may monitor a first area 902 defined by first and second defining marks 904, 906, and the second camera may monitor a second area 912 defined by first and second defining marks 914, 916. The first and second areas to be monitored includes at least one route 920 that extends between the first and second areas. For example, a portion of the route is disposed within the first area being monitored by the first camera, and another portion of the route is disposed within the second area being monitored by the second camera.

In the illustrated embodiment, a vehicle system 908 moves along the route in a direction 918. For example, the vehicle system is disposed within the first area that is monitored by the first camera, and is moving in a direction along the route toward the second area that is monitored by the second camera. In one or more embodiments, the control system may receive sensed data from the first and second cameras. For example, the control system may receive sensed data from the first camera indicating when the vehicle system has moved out of the first area, and may receive sensed data from the second camera indicating when the vehicle system has moved into the second area as the vehicle system moves along the route.

In one or more embodiments, the control system may use the received sensed data to determine a moving speed of the vehicle system, a change in speed of the vehicle system, or the like. Optionally, the control system may be anticipating the vehicle system to enter into the second area at a predetermined time, and may determine that the vehicle system entered into the second area at a time greater than or less than the predetermined time. Optionally, the control system may be anticipating the vehicle system to enter into the second area, and may communicate an alert to the vehicle system responsive to determining that the vehicle system has not entered into the second area. For example, the vehicle system may have experienced a failure or other issue causing the vehicle system to stop before reaching the second area.

In one or more embodiments, the control system may virtually track movement of the vehicle system while the vehicle system moves in a gap area 910 between the first and second areas. For example, the control system may determine the virtual location of the vehicle system based on the last known trajectory of the vehicle system while the vehicle system was moving in the first area, and calculate an expected time of entry of the vehicle system into the second area based on the trajectory. The control system may communicate an alarm responsive to the vehicle system not entering into the second area by the expected time of entry, or at a time that is after or later than the expected time of entry.

In one or more embodiments, the control system may receive sensed data from plural different cameras. The cameras may be positioned such that the cameras provide panoramic or three-dimensional visual data of an area to be monitored. For example, visual data of one camera may be stitched together (or otherwise coupled with) with visual data of an adjacent camera to form a combined image based on the visual data obtained from the two cameras.

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

In one or more embodiments, the processors may be initially trained to determine a position of the camera, the position of the asset moving within the field of view of the camera, or the like. Overtime, after a predetermined amount or length of usage, after a predetermined amount of data and/or other information has been obtained, or the like, the processors may be taught, the training may be revised, or the like, over time. The processors may be taught and/or retrained in policies, on expected observations of the field of view, on expected behaviors of objects or assets within the field of view, or the like, using one or more of machine learning, artificial intelligence, or the like.

In accordance with one example or aspect, a method may include receiving details of an area to be monitored, and receiving one of a) position details of an asset moving within a field of view of the area to be monitored, or b) position details of a camera configured to monitor the area. The method may include determining one of c) a position of the camera responsive to receiving the position details of the asset moving within the field of view of the area; or d) a position of the asset moving within the field of view responsive to receiving the position details of the camera.

Optionally, determining the position of the camera may include identifying a first defining mark and a second defining mark of the field of view of the area. Optionally, the first defining mark may be one or more of a first edge of the field of view of the camera, a first object within the field of view of the camera, or a first location within the field of view of the camera. Optionally, the second defining mark may be one or more of a second edge of the field of view of the camera, a second object within the field of view of the camera, or a second location within the field of view of the camera. Optionally, the method may include detecting movement of the asset within the field of view relative to the first and second defining marks. Optionally, determining the position of the camera may include monitoring movement of the asset within the field of view along at least one of plural paths. Optionally, the method may include monitoring the area, and detecting movement of one or more objects within the field of view of the area. Optionally, the method may include determining that at least one of the one or more objects is moving within the area one or more of along a prohibited pathway or within a prohibited region, and communicating an alert responsive to the at least one object moving one or more of along the prohibited pathway or within the prohibited region. Optionally, the method may include receiving the position details of the camera configured to monitor the area responsive to starting a new monitoring session. Optionally, the method may include receiving the position details of the asset moving within a field of view of the area to be monitored responsive to changing a position of the camera from a first position to a second position. Optionally, the camera may be in a first position to monitor the area, and the camera may be in the second position to monitor a different area. Optionally, the position details of the area may include one or more of topographical details, route zones, allowed regions, or prohibited regions.

In accordance with one example or aspect, a monitoring system may include a camera to monitor a first area, and a controller comprising one or more processors. The controller may receive sensed data from the camera. The processors may include details of the first area to be monitored. The processors may receive one of a) position details of an asset moving within a field of view of the first area to be monitored, or b) position details of a camera configured to monitor the first area. The processors may determine one of c) a position of the camera responsive to receiving the position details of the asset moving within the field of view of the first area, or d) a position of the asset moving within the field of view responsive to receiving the position details of the camera.

Optionally, the one or more processors may identify a first defining mark and a second defining mark of the field of view of the first area. Optionally, the first defining mark may be one or more of a first edge of the field of view, a first object within the field of view, or a first location within the field of view, and the second defining mark may be one or more of a second edge of the field of view, a second object within the field of view, or a second location within the field of view. Optionally, the camera may detect movement of the asset within the field of view relative to the first and second defining marks. Optionally, the one or more processors may determine the position of the camera responsive to the camera monitoring movement of the asset within the field of view along at least one of plural paths. Optionally, the camera may detect movement of one or more objects within the field of view of the first area. Optionally, the one or more processors may determine that at least one of the one or more objects moving within the first area one or more of along a prohibited pathway or within a prohibited region, and may communicate an alert responsive to the at least one object moving the one or more of along the prohibited pathway or within the prohibited region.

In accordance with one example or aspect, a method may include receiving one of a) position details of an asset moving within a field of view of an area to be monitored, or b) position details of a camera configured to monitor the area. The method may include determining one of c) a position of the camera responsive to receiving the position details of the asset moving within the field of view, or d) a position of the asset moving within the field of view responsive to receiving the position details of the camera. The method may include monitoring the area, detecting movement of one or more objects within the field of view of the area with the camera, determining that at least one of the one or more objects moving within the area one or more of along a prohibited pathway or within a prohibited region, and communicating an alert responsive to the at least one object moving one or more of along the prohibited pathway or within the prohibited region.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMs, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and clauses, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and clauses, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The clauses define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
  receiving details of an area to be monitored;
  receiving position details of a camera configured to monitor the area;
  determining a position of an asset moving within a field of view responsive to receiving the position details of the camera;
  receiving position details of the asset moving within a field of view of the area to be monitored responsive to changing a position of the camera from a first position to a second position;
  determining that at least one of one or more objects is moving within the area one or more of along a prohibited pathway or within a prohibited region; and
  communicating an alert responsive to the at least one object moving one or more of along the prohibited pathway or within the prohibited region.

2. The method of claim 1, wherein determining the position of the camera includes identifying a first defining mark and a second defining mark of the field of view of the area.

3. The method of claim 1, further comprising receiving the position details of the camera configured to monitor the area responsive to starting a new monitoring session.

4. The method of claim 1, wherein determining the position of the camera includes monitoring movement of the asset within the field of view along at least one of plural paths.

5. The method of claim 1, wherein the camera in the first position is configured to monitor the area, and the camera in the second position is configured to monitor a different area.

6. The method of claim 1, wherein position details of the area include one or more of topographical details, route zones, allowed regions, or prohibited regions.

7. The method of claim 4, further comprising:
  monitoring the area; and
  detecting movement of the one or more objects within the field of view of the area.

8. The method of claim 2, wherein the first defining mark is one or more of a first edge of a field of view of the camera, a first object within the field of view of the camera, or a first location within the field of view of the camera.

9. The method of claim 2, further comprising detecting movement of the asset within the field of view relative to the first and second defining marks.

10. A method comprising:
  receiving details of an area to be monitored;
  receiving one of:
    a) position details of an asset moving within a field of view of the area to be monitored; or
    b) position details of a camera configured to monitor the area;
  determining one of:
    c) a position of the camera responsive to receiving the position details of the asset moving within the field of view of the area; or
    d) a position of the asset moving within the field of view responsive to receiving the position details of the camera;
  determining that at least one of one or more objects is moving within the area one or more of along a prohibited pathway or within a prohibited region; and
  communicating an alert responsive to the at least one object moving one or more of along the prohibited pathway or within the prohibited region.

11. The method of claim 10, wherein determining the position of the camera includes identifying a first defining mark and a second defining mark of the field of view of the area, wherein the second defining mark is one or more of a second edge of the field of view of the camera, a second object within the field of view of the camera, or a second location within the field of view of the camera.

12. A monitoring system comprising:
  a camera configured to monitor an area; and
  a controller comprising one or more processors configured to receive sensed data from the camera, the one or more processors including details of the area to be monitored,
  wherein the one or more processors are configured to receive one of:
    a) position details of an asset moving within a field of view of the area to be monitored; or
    b) position details of a camera configured to monitor the area,
  wherein the one or more processors are configured to determine one of:
    c) a position of the camera responsive to receiving the position details of the asset moving within the field of view of the area; or
    d) a position of the asset moving within the field of view responsive to receiving the position details of the camera,
  wherein the one or more processors are configured to determine that at least one of one or more objects is moving within the area one or more of along a prohibited pathway or within a prohibited region, and
  wherein the one or more processors are configured to communicate an alert responsive to the at least one object moving one or more of along the prohibited pathway or within the prohibited region.

13. The monitoring system of claim 12, wherein the one or more processors are configured to identify a first defining mark and a second defining mark of the field of view of the area, wherein the first defining mark is one or more of a first edge of the field of view, a first object within the field of view, or a first location within the field of view, and the second defining mark one or more of a second edge of the field of view, a second object within the field of view, or a second location within the field of view.

14. A monitoring system comprising:
  a camera configured to monitor an area; and
  a controller comprising one or more processors configured to receive sensed data from the camera, the one or more processors including details of the area to be monitored, the one or more processors configured to receive position details of the camera configured to monitor the area, the one or more processors configured to determine a position of an asset moving within a field of view responsive to receiving the position details of the camera, the one or more processors configured to identify a first defining mark and a second defining mark of a field of view of the area, wherein the one or more processors are configured to determine that at least one of the one or more objects is moving within the area one or more of along a prohibited pathway or within a prohibited region, and wherein the one or more processors are configured to communicate an alert responsive to the at least one object moving the one or more of along the prohibited pathway or within the prohibited region.

15. The monitoring system of claim 14, wherein the camera is configured to detect movement of the one or more objects within the field of view of the area.

16. The monitoring system of claim 14, wherein the camera is configured to detect movement of the asset within the field of view relative to the first and second defining marks.

17. The monitoring system of claim 14, wherein the one or more processors are configured to determine a position of the camera responsive to the camera monitoring movement of the asset within the field of view along at least one of plural paths.

18. A method comprising:

receiving position details of a camera configured to monitor the area;

determining a position of the asset moving within the field of view responsive to receiving the position details of the camera;

monitoring the area;

detecting movement of one or more objects within the field of view of the area with the camera;

determining that at least one of the one or more objects is moving within the area one or more of along a prohibited pathway or within a prohibited region; and communicating an alert responsive to the at least one object moving one or more of along the prohibited pathway or within the prohibited region.

* * * * *